United States Patent Office 3,253,527
Patented May 31, 1966

3,253,527
TWIN-LENS REFLEX FOCUSING DEVICE
Hermann Bretthauer, Stockheim near Braunschweig, and Heinz Hamm, Braunschweig, Germany, assignors to Rollei-Werke Franke & Heidecke, Braunschweig, Germany, a firm of Germany
Filed Sept. 10, 1962, Ser. No. 222,286
Claims priority, application Germany, Sept. 12, 1961, F 34,907
3 Claims. (Cl. 95—44)

This invention relates to a photographic camera, and more particularly to a viewfinder for a camera, especially a camera of the twin lens reflex type.

An object of the invention is the provision of a generally improved and more satisfactory viewfinder for a twin lens reflex camera.

Another object is the provision of a viewfinder arrangement for twin lens reflex cameras, so designed as to provide an eye level finder without appreciably increasing the height of the camera.

A further object is the provision of a viewfinder of eye level type permanently built into the body of a twin lens reflex camera rather than being a detachable attachment, and of such construction as to provide an erect image rather than an inverted image.

These and other desirable objects may be attained in the manner disclosed as an illustrative embodiment of the invention in the following description and in the accompanying drawings forming a part hereof, in which.

Figure 1:
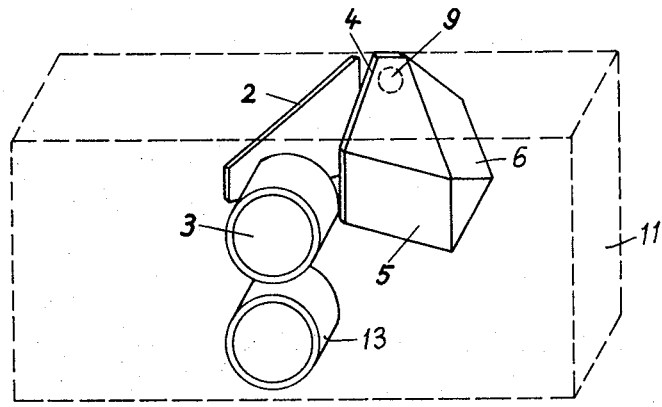
FIG. 1 is a somewhat schematic perspective view of a twin lens reflex camera equipped with a finder according to a preferred embodiment of the present invention.

Referring now to FIG. 1, a typical twin lens reflex camera body, of generally rectangular outline, is shown schematically at 11. As usual, the camera is provided with a picture taking lens the mount of which is indicated at 13, and with a finder lens 3 above the picture taking lens. The optical axes of both lenses are parallel to each other and arranged in a common vertical plane extending forwardly from the camera, both axes being horizontal when the camera is held in normal horizontal position.

As well understood in the art, a twin lens reflex camera customarily has a horizontally arranged focusing screen or finder screen at the top of the camera, and the light rays entering through the finder lens 3 are deflected upwardly by an inclined mirror so that they fall on the horizontal finder screen. This is very satisfactory for taking pictures from waist level, the operator looking downwardly onto the finder screen. However, other arrangements have to be used when taking pictures at eye level. Any arrangement for eye level viewing of the conventional horizontal focusing screen or viewfinder screen necessarily involves placing a mirror or prism or other light deflecting means above the conventional horizontal screen, thereby increasing the over-all height of the camera. According to the present invention, on the contrary, the viewfinder screen and the light reflecting or deflecting parts are oriented differently, in such a way that convenient eye level viewing of the image is possible, without increasing the over-all height of the camera.

Figure 2:
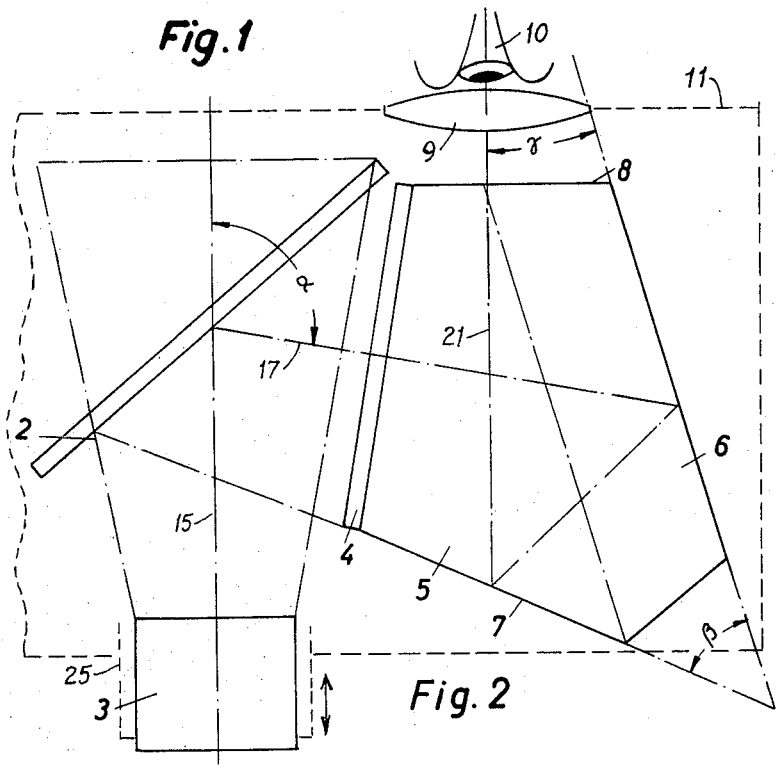
FIG. 2 is a schematic top plan view of the optical parts of the viewfinder of the present invention.
Figure 3:
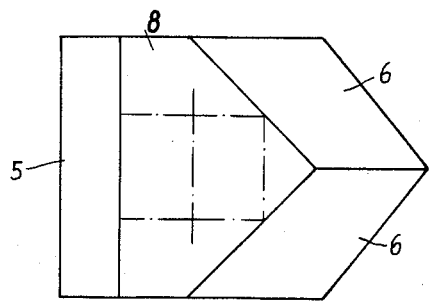
FIG. 3 is a rear end view or rear elevation of a pentaprism constituting part of the finder of the present invention.

According to the preferred embodiment of the present invention, the light entering through the finder lens 3 is reflected by a mirror 2 which is arranged in a vertical plane obliquely intercepting the horizontal optical axis 15 (FIG. 2) of the finder lens. Thereby the rays of light are reflected laterally as at 17 so as to fall on a focusing screen 4 of ground glass or other suitable known material. The focusing screen 4, like the mirror 2, lies in a vertical plane which is arranged generally parallel to the optical axis 15 of the finder lens and the corresponding optical axis of the picture taking lens, but which preferably is at a slight inclination to these axes as further mentioned below.

The vertical focusing screen 4 forms the base surface of the pentaprism 5, of a construction sometimes called a roof prism. In a manner understod in the optical art, the rays of light from the finder screen 4 pass laterally through the prism to the angular roof surfaces 6 thereof, where they are reflected from one inclined roof surface to the other in order to erect the image (which was inverted on the screen 4) and thence are reflected from the second inclined roof surface to the reflecting surface 7, and thence reflected by this surface to pass rearwardly out the rear end 8 of the prism, and through the eyepiece lens 9 to the eye 10 of the observer. Thus the eye of the observer, looking forwardly through the eyepiece lens 9 and toward the rear face 8 of the pentaprism, sees an erect image of the field of view of the finder lens 3.

If the mirror 2 is placed at an angle of 45 degrees to the optical axis 15 of the finder lens 3, the central ray of light will be deflected through an angle of 90 degrees. In such a case, the finder screen 4 should be placed parallel to the optical axis 15, since the central reflected ray should fall perpendicularly on the focusing screen. For the sake of a more compact arrangement, however, it is preferred to incline the mirror 2 at an angle of about 50 degrees to the optical axis 15, so that the central or axial ray will be deflected through an angle alpha of approximately 100 degrees instead of the customary deflection of 90 degrees. Therefore, the focusing screen 4 is inclined at a corresponding angle to the optical axis 15, so that the central reflected ray 17 will fall perpendicularly on the focusing screen. In other words, if the mirror is at an angle of 50 degrees to the optical axis, so that the deflection angle alpha is 100 degrees, then the focusing screen 4 is placed at 10 degrees to the optical axis 15, as shown. A particularly compact arrangement results when the inclination of the surfaces is as mentioned above, and furthermore if the roof edge (that is, the edge where the two inclined roof surfaces 6 intersect each other) is inclined at an angle of about 16.5 degrees to the optical axis of the finder lens, and if the second reflecting surface 7 of the prism is inclined at about 50 degrees relative to the roof edge, this angle being shown at beta in FIG. 2. With such an arrangement, the viewfinder axis 21, or axis along which the observer sights, is parallel to the optical axis 15 of the finder lens 3, and particularly small dimensions of the image-erecting prism are possible, thereby shortening the path of the rays and giving stronger magnification of the finder image.

The above mentioned angles, namely, angle alpha of 100 degrees, angle beta of 50 degrees, and angle gamma of 16.5 degrees, are the preferred angles, but relatively small deviations from these preferred angle values are not detrimental and do not cause deterioration of the results. For example, the angle alpha may vary plus or minus 5 degrees from the preferred value of 100 degrees, and the inclination angle gamma of the roof edge may vary from 12 degrees to 20 degrees.

It is immaterial whether the focusing screen 4 be a ground surface or other diffusing surface formed directly on the corresponding face of the pentaprism 5, or whether it be a separate focusing screen element cemented or otherwise held tight against the corresponding face of the pentaprism.

With the described arrangement, it is seen that the viewfinder optical system lies mainly to one side of the finder lens axis, rather than projecting above it, so that it does not cause any increase in the height of the camera body. It eliminates the need for a focusing hood such as heretofore conventionally used on the top of a twin lens reflex camera body. Yet the finder of the present invention still permits the twin lens reflex camera to be focused on the familiar twin lens reflex principles; that is, the picture taking lens 13 and finder lens 3 are both mounted in the conventional manner on a movable front member 25 which is moved axially forwardly and rearwardly, relative to the camera body 11, for purposes of focusing, and the user knows that the picture taking lens 13 is in proper focus when he observes that the image on the focusing screen 4, as seen through the pentaprism, is sharply defined or in sharp focus. The finder arrangement of the present invention is suitable for a twin lens reflex camera in which the film travels in the customary vertical direction, but is even more suitable for the type of twin lens reflex camera in which the film travels horizontally rather than vertically, for in such a camera the body of the camera is somewhat elongated laterally in a horizontal direction, in order to provide room for the film spools, and in such a laterally elongated body there is plenty of room for the pentaprism and associated parts, without crowding.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A twin lens reflex focusing view-finder camera comprising a camera body, a picture taking lens and a view-finder lens mounted on said body with their respective optical axes parallel to each other and lying in a common vertical plane, a focusing screen arranged vertically and offset laterally from the optical axis of the finder lens, a vertically arranged mirror intersecting the axis of the finder lens and located behind the finder lens for deflecting light rays from said finder lens laterally so as to fall on said focusing screen, a view-finder eye-piece having an optical axis substantially parallel to and offset laterally from the optical axis of the finder lens, and an image inverting roof prism optically interposed between said focusing screen and said eye-piece so that the inverted image of the scene on said screen will again be inverted by said prism and will be observed through said eye-piece as an erect image, said mirror being at an angle of about 50 degrees to the optical axis of the finder lens, to cause a light beam deflection of the axial ray laterally through an angle of about 100 degrees, said focusing screen being inclined at an angle of about 10 degrees to the common vertical plane containing the optical axes of said picture taking lens and said finder lens, said roof prism having two inclined roof surfaces substantially meeting at a roof edge, said roof edge being inclined at an angle of about 16.5 degrees to the optical axis of the finder lens.

2. A construction as defined in claim 1, in which said roof prism is a pentaprism having one reflecting face inclined at an angle of about 50 degrees to said roof edge.

3. A twin lens reflex focusing view-finder camera comprising a camera body, a picture taking lens and a view-finder lens mounted on a common support movable axially forwardly and backwardly relative to said body for focusing, the respective optical axes of the two lenses being substantially parallel to each other, a reflecting element mounted in said body in position to intersect the optical axis of the finder lens and to deflect an axial ray from said finder lens in a lateral direction to one side of the axis of said finder lens, a focusing screen mounted in stationary position in said body and arranged in an upright position laterally of said axis of said finder lens in position to receive an image formed by rays deflected by said reflecting element, said image being inverted with respect to the original scene, and an inverting pentaprism of the roof type also arranged laterally of said axis of said finder lens for again inverting the image on the screen so that an erect image of the original scene may be observed through said pentaprism, the parts being so arranged that the viewing axis of an observer looking into the pentaprism to see the finder image is substantially parallel to and laterally offset from and at substantially the same elevation as the optical axis of the finder lens, said reflecting element deflecting the axial ray from the finder lens through an angle of about 100 degrees, said screen being arranged at an angle of about 10 degrees to the optical axis of the finder lens, said pentaprism having a roof edge inclined at an angle of about 16.5 degrees to the optical axis of the finder lens, said pentaprism also having a reflecting face inclined at an angle of about 50 degrees to said roof edge.

References Cited by the Examiner

UNITED STATES PATENTS

| 2,219,314 | 10/1940 | Hoch | 95—44 |
| 2,506,764 | 5/1950 | Bach | 95—44 X |
| 2,649,038 | 8/1953 | Blue | 95—44 |
| 2,992,599 | 7/1961 | Jurenz | 95—10 |

JOHN M. HORAN, *Primary Examiner.*

NORTON ANSHER, *Examiner.*